US011082661B1

(12) United States Patent
Pollefeys

(10) Patent No.: US 11,082,661 B1
(45) Date of Patent: Aug. 3, 2021

(54) VIRTUAL CONFERENCE VIEW FOR VIDEO CALLING

(71) Applicant: Microsoft Technology Licensing, LLC, Redmond, WA (US)

(72) Inventor: Marc Andre Leon Pollefeys, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/033,203

(22) Filed: Sep. 25, 2020

(51) Int. Cl.
*H04N 7/15* (2006.01)
*H04N 5/272* (2006.01)
*H04N 5/262* (2006.01)

(52) U.S. Cl.
CPC .............. *H04N 7/15* (2013.01); *H04N 5/2628* (2013.01); *H04N 5/272* (2013.01)

(58) Field of Classification Search
CPC ........... H04N 7/15; H04N 5/262; H04N 5/272
USPC ............................................ 348/14.01–14.16
See application file for complete search history.

(56) References Cited

U.S. PATENT DOCUMENTS

| 9,264,660 | B1 | 2/2016 | Petterson et al. |
| 9,432,625 | B2 | 8/2016 | Delegue et al. |
| 9,918,042 | B2 | 3/2018 | Torres et al. |
| 10,139,917 | B1 * | 11/2018 | Nariyawala ............ H04N 7/15 |
| 10,440,325 | B1 * | 10/2019 | Boxwell ................ H04N 5/445 |
| 2011/0314105 | A1 * | 12/2011 | Chen .................... G06Q 10/103 709/205 |
| 2012/0200661 | A1 | 8/2012 | Mock |

(Continued)

FOREIGN PATENT DOCUMENTS

| CN | 109274924 A | 1/2019 |
| GB | 2450345 A | 12/2008 |
| JP | H1056626 A | 2/1998 |

OTHER PUBLICATIONS

"Selecting the Layout Seen by Participants", Retrieved from: https://web.archive.org/web/20191021051710/https:/docs.pexip.com/admin/changing_layout.htm, Oct. 21, 2019, 9 Pages.

(Continued)

*Primary Examiner* — Melur Ramakrishnaiah
(74) *Attorney, Agent, or Firm* — Alleman Hall Creasman & Tuttle LLP

(57) ABSTRACT

A method for video calling comprises, at a server computing system, receiving a plurality of segmented participant video streams from a plurality of client computing devices, each segmented participant video stream depicting a different human participant participating in a video call. One or more priority parameters for each of the plurality of human participants are recognized. One or more human participants are ranked based on a cumulative participant priority for each of the plurality of human participants. The plurality of segmented participant video streams are composited into a virtual conference view that displays each of the ranked one or more human participants at a virtual position based on their cumulative participant priority, such that human participants having higher cumulative participant priorities are displayed more prominently than human participants having lower cumulative participant priorities. The virtual conference view is sent to the plurality of client computing devices.

20 Claims, 9 Drawing Sheets

(56) References Cited

U.S. PATENT DOCUMENTS

| | | | |
|---|---|---|---|
| 2014/0229866 A1* | 8/2014 | Gottlieb | H04L 12/1822 |
| | | | 715/758 |
| 2014/0267583 A1* | 9/2014 | Zhu | H04N 19/21 |
| | | | 348/14.13 |
| 2014/0320591 A1* | 10/2014 | Baron, Jr. | H04N 7/15 |
| | | | 348/14.08 |
| 2015/0208031 A1 | 7/2015 | Lievens et al. | |
| 2018/0098026 A1* | 4/2018 | Gadnir | H04N 5/23203 |
| 2020/0005028 A1* | 1/2020 | Gu | G06K 9/00389 |

OTHER PUBLICATIONS

Bass, Dina, "Microsoft Introduces Virtual 'Theater' Seating to Help Relieve Video Meeting Fatigue", Retrieved from: https://www.bloomberg.com/news/articles/2020-07-08/microsoft-introduces-virtual-theater-seating-to-help-relieve-video-meeting-fatigue, Jul. 8, 2020, 3 Pages.

\* cited by examiner

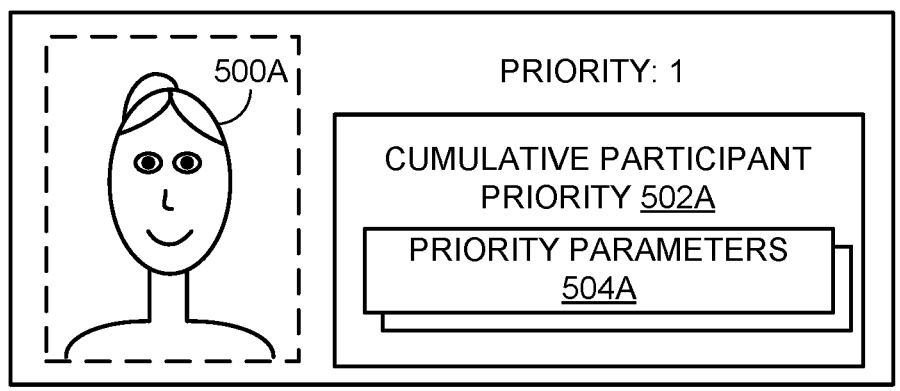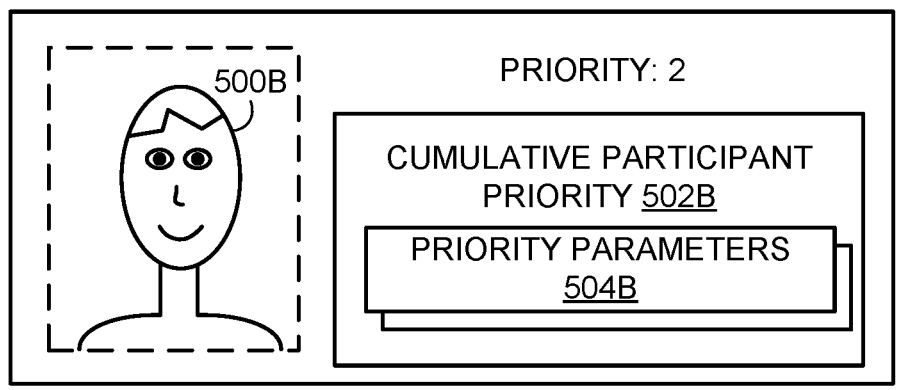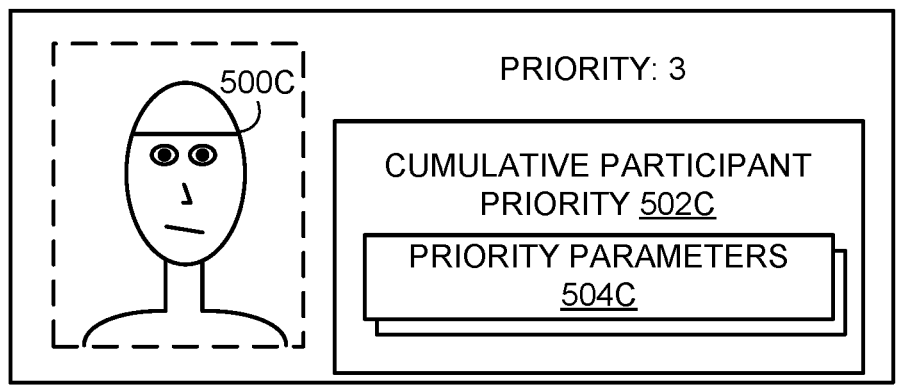
FIG. 5

VIRTUAL CONFERENCE VIEW FOR VIDEO CALLING

BACKGROUND

Computing devices may be used to enable real-time communication between two or more users over a network. When the computing devices utilize a suitable camera, the real-time communication may include live video of the users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for video calling comprises, at a server computing system, receiving a plurality of segmented participant video streams from a plurality of client computing devices, each segmented participant video stream depicting a different human participant participating in a video call. One or more priority parameters for each of the plurality of human participants are recognized. One or more human participants are ranked based on a cumulative participant priority for each of the plurality of human participants. The plurality of segmented participant video streams are composited into a virtual conference view that displays each of the ranked one or more human participants at a virtual position based on their cumulative participant priority, such that human participants having higher cumulative participant priorities are displayed more prominently than human participants having lower cumulative participant priorities. The virtual conference view is sent to the plurality of client computing devices.

BRIEF DESCRIPTION OF THE DRAWINGS

FIG. 5 schematically illustrates ranking of human participants based on cumulative participant priority.

DETAILED DESCRIPTION

Video calling may be used to facilitate real-time communication between two or more human video call participants. In this manner, human participants in the video call can see each other's faces and body language as they communicate, which can provide a better substitute for in-person communication than audio-only or text-only alternatives.

Figure 1:
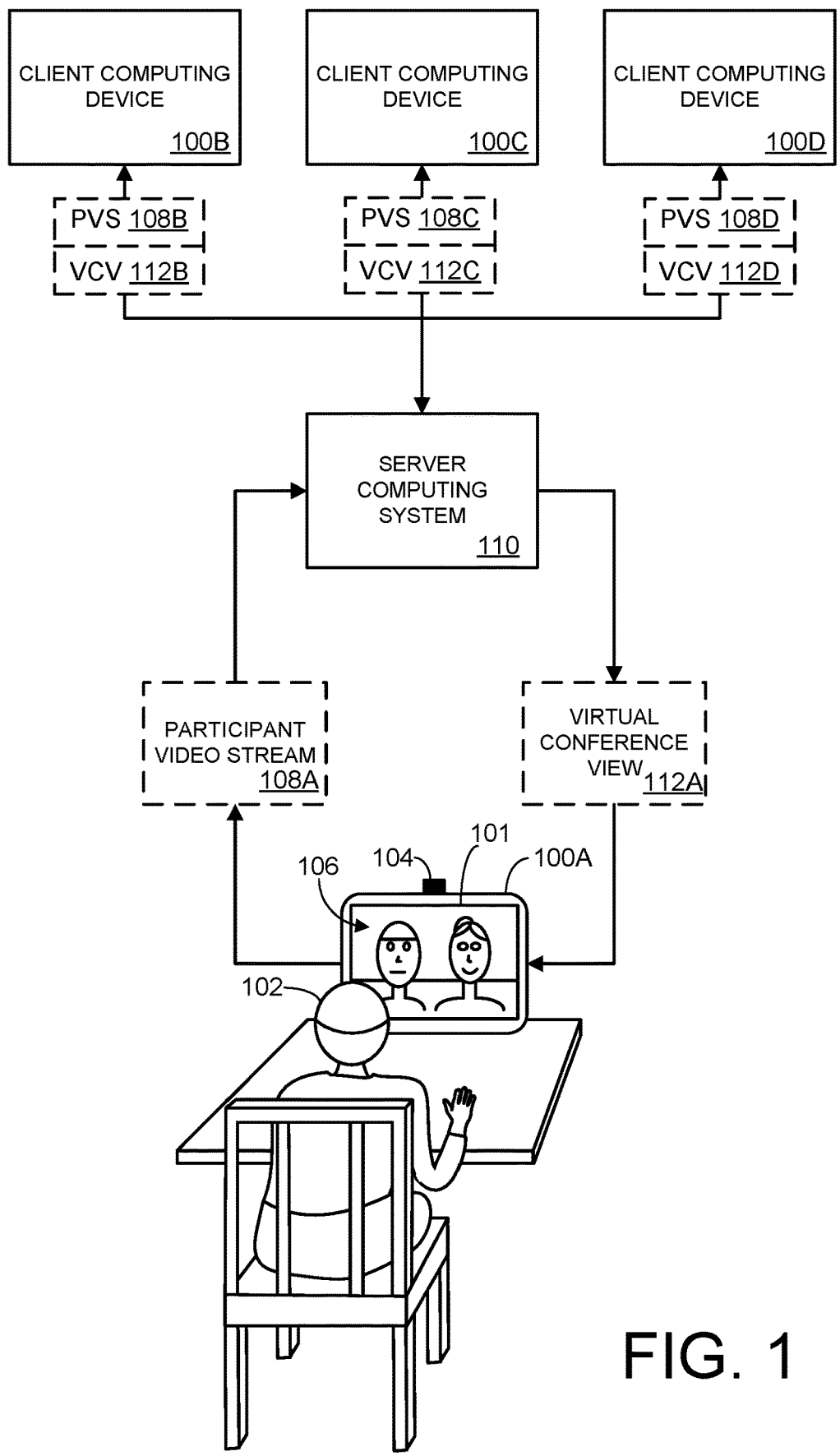
FIG. 1 schematically depicts a client computing device streaming a participant video stream to a server computing system.

FIG. 1 schematically illustrates an ongoing video call including a plurality of human participants. A client computing device 100A is capturing a live video stream depicting a human participant 102 via a camera 104. FIG. 1 also schematically shows a plurality of other client computing devices 100B, 100C, and 100D, corresponding to other human participants not shown in FIG. 1. Each client computing device may have any suitable hardware configuration and form factor. For example, client computing devices may take the form of desktop computers, laptop computers, tablets, smartphones, dedicated videoconferencing devices, virtual/augmented reality devices, media centers, smart assistant devices, gaming consoles, etc. Any or all of the client computing devices may be implemented as computing system 900 described below with respect to FIG. 9.

Furthermore, in FIG. 1, client computing device 100A includes an integrated display device 101. Additionally, or alternatively, client computing devices as described herein may be communicatively coupled with one or more external display devices, taking any suitable form. Suitable display devices may include computer monitors, virtual/augmented reality displays, televisions, projectors, etc.

In the example of FIG. 1, client computing device 100A is communicatively coupled with a camera 104 that captures a live video stream of human participant 102. For example, camera 104 may take the form of a webcam that is separate from, but communicates with, client computing device 100A. In other examples, however, a camera may be integrated into the client computing device. Though only one camera is depicted in FIG. 1, a client computing device may communicate with any number of cameras, which may each capture different video streams. Furthermore, in FIG. 1, the camera is positioned in close proximity to client computing device 100A. It will be understood, however, that the camera may have any suitable position with respect to the client computing device.

The present disclosure primarily assumes that each client computing device will include a camera useable to capture a video stream of a corresponding human participant. In general, however, it is not required for all human participants in an ongoing video call to be depicted in corresponding live video streams. Rather, some number of human participants may be represented in an ongoing video call by suitable non-video representations—e.g., a profile picture, a generic avatar, or a computer-generated model resembling the human participant. Furthermore, in some cases, a camera may capture a video stream depicting two or more different human participants, or a single client computing device may capture two or more different video streams corresponding to different human participants using multiple cameras.

In some cases, a camera communicatively coupled with a client computing device may also include a microphone configured to receive audio from its surrounding environment—e.g., speech from a human participant. Additionally, or alternatively, the client computing device may receive audio from one or more microphones separate from a camera used to capture a participant video stream. In such cases, audio from the one or more microphones may be combined or packaged with video captured by one or more cameras.

Client computing device 100A is also displaying visual content 106 depicting other human participants in the ongoing video call. As will be described in more detail below, such visual content may take the form of a virtual conference view, in which each of a plurality of different participant video streams corresponding to different human participants are composited together.

It can be challenging during video calls to provide visual feedback consistent with an actual in-person gathering. For instance, during in-person gatherings, people often group themselves according to their social relationships or roles within an organizational hierarchy. By contrast, video calling interfaces often display video streams corresponding to different human participants at somewhat arbitrary positions. Furthermore, as human participants enter and leave a video call, the position of each participant's corresponding video stream within the video calling interface may shift and change. This can be disconcerting for participants in the video call, making it difficult to keep track of individuals that a particular participant may wish to view, listen to, or otherwise interact with. These problems are only exacerbated as the number of participants in the video call increases.

Accordingly, the present disclosure is directed to techniques for video calling, in which a plurality of different participant video streams corresponding to different human participants in a video call are composited into a "virtual conference view." For example, background segmentation may be used to remove at least a portion of a real-world background behind each human participant, and the various segmented participant video streams may be composited over a backdrop that resembles a virtual auditorium, conference hall, or other meeting space, to help create an illusion that the various human participants are actually assembled in a real-world space. One or more human participants in the video call may be ranked based on various priority parameters, and placed at positions within the virtual conference view corresponding to a cumulative priority based on these parameters. For example, participants who are socially or professionally connected to a meeting host, organizer, or presenter automatically may be placed at positions within the virtual conference view having higher prominence. In this manner, video calling may more effectively simulate in-person gatherings, providing for more natural and efficient communication and collaboration.

Figure 2:
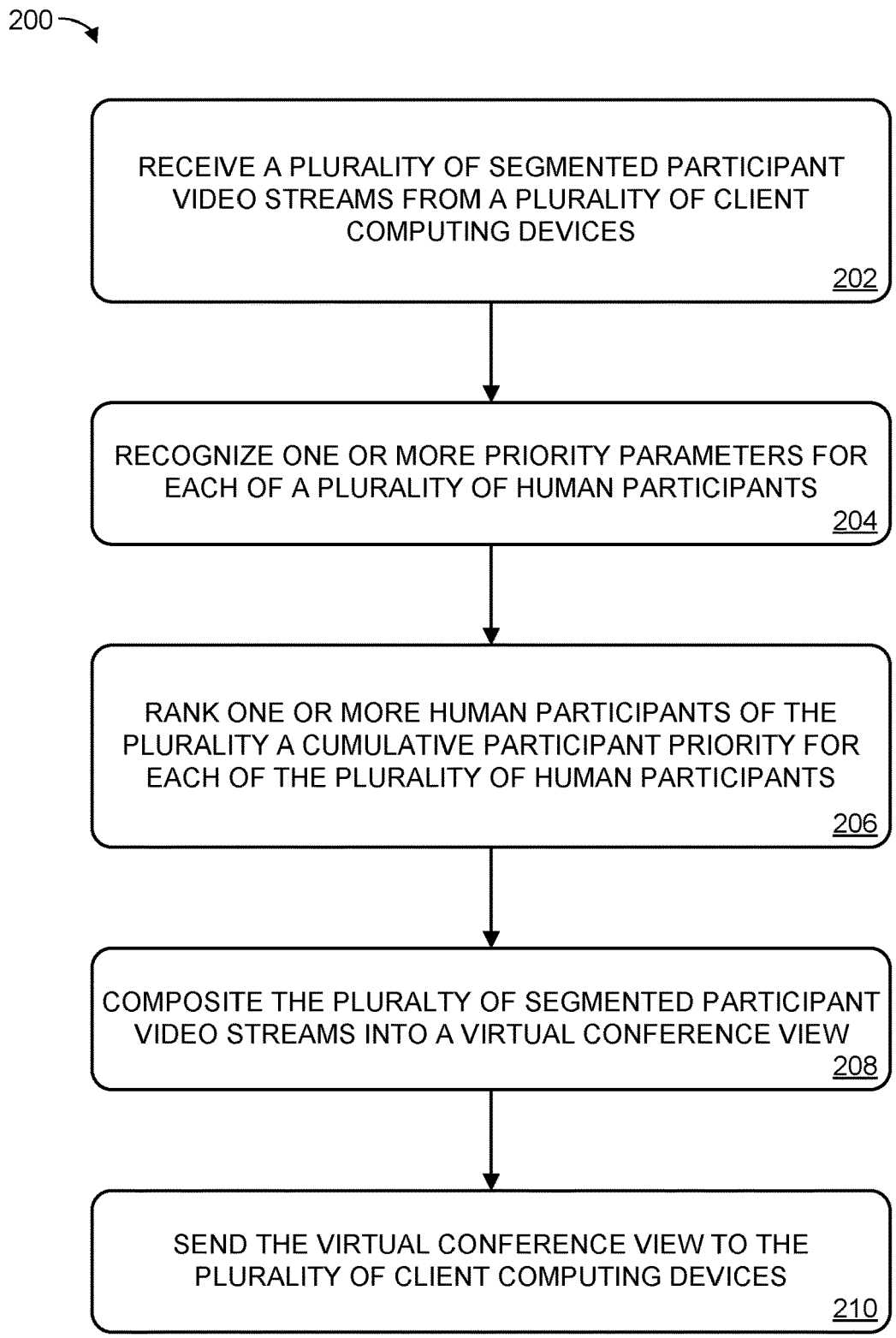
FIG. 2 illustrates an example, server-side method for video calling.

FIG. 2 illustrates an example method 200 for video calling. For the purposes of this disclosure, steps of method 200 are described as being performed by a "server computing system." The server computing system may include one or more computing devices working cooperatively. In general, however, method 200 may be implemented by any suitable computing device(s) having any hardware configuration(s) and form factor(s). In some examples, method 200 may be implemented by computing system 900 described below with respect to FIG. 9.

At 202, method 200 includes receiving a plurality of segmented participant video streams from a plurality of client computing devices. As will be described in more detail below, background segmentation and/or other video processing may be applied to participant video streams to produce "segmented" video streams. When the segmentation includes background removal, at least a portion of the real-world background visible behind each human participant is removed from the video stream. In some examples, the actual background is replaced with a transparent background.

Receiving of participant video streams at a server computing system is schematically illustrated in FIG. 1. As described above, client computing device 100A uses camera 104 to capture a video stream of human participant 102. This video stream is sent to a server computing system 110 as a participant video stream 108A. The server computing system also receives participant video streams 108B, 108C, and 108D from client computing devices 100B, 100C, and 100D. Thus, the server computing system receives a plurality of participant video streams from a plurality of client computing devices, each participant video stream depicting a different human participant participating in an ongoing video call including a plurality of human participants. The participant video streams may be received over any suitable computer network including, for example, the Internet.

As discussed above, in some cases the server computing system may include two or more server computing devices working cooperatively. In particular, during video calls including relatively large numbers of individual participant video streams (e.g., dozens, hundreds, or thousands of individual streams), one single server computing device may not have sufficient computing resources to composite each of the participant video streams into a virtual conference view. Thus, in some cases, compositing of participant video streams may be divided between two or more server computing devices comprising a server computing system.

For example, a plurality of server computing devices may be configured to perform hierarchical compositing—e.g., one or more server computing devices may composite one or more participant video streams into a partial virtual conference view, and then one or more other server computing devices may composite additional participant video streams to give a final virtual conference view that may be transmitted to client computing devices. Such collaborative compositing may be distributed between multiple server computing devices in any suitable way. For example, one or more initial server computing devices may composite participant video streams in a background of the virtual conference view—e.g., corresponding to participants positioned relatively far away from a virtual camera position, as will be described in more detail below. Additional server computing devices may composite additional participant video streams over the background streams, and this may be repeated for any suitable number of "layers" to scale the final virtual conference view to include an arbitrarily large number of total participants (e.g., thousands).

While such hierarchical compositing may increase overall latency associated with rendering a virtual conference view for a video call, such latency may be relatively minor as compared to existing latency associated with transmitting live video streams over computer networks. Furthermore, when background-to-foreground hierarchical compositing is performed as described above, participant video streams composited in the foreground will be least affected by the increased latency. Thus, as will be described in more detail below, it may be desirable to position participant video streams corresponding to participants having relatively higher priority in the foreground of the virtual conference view—e.g., closer to a virtual camera position.

In the example of FIG. 1, the server computing system receives four different participant video streams, corresponding to four different human participants in the ongoing video call. However, this is only a non-limiting example. In general, the techniques described herein may be applied in any scenario where a server computing system receives two or more participant video streams, and may be scaled up to dozens, hundreds, thousands, or more simultaneous participant video streams.

As indicated above, background segmentation may in some cases be applied to each of the plurality of participant video streams. This may produce segmented video streams in which at least a portion of a real-world background behind each human participant is removed. It may be generally desirable for background segmentation to be performed by the plurality of client computing devices prior to sending the participant video streams to the server computing system, such that the server computing system receives segmented participant video streams. This is due to the fact that it can be computationally taxing for the server computing system to perform background segmentation on multiple participant video streams, while each client computing device will generally only apply background segmentation to one participant video stream. In general, however, background segmentation may be performed by either or both of the server computing system and plurality of client computing devices.

Figure 3:
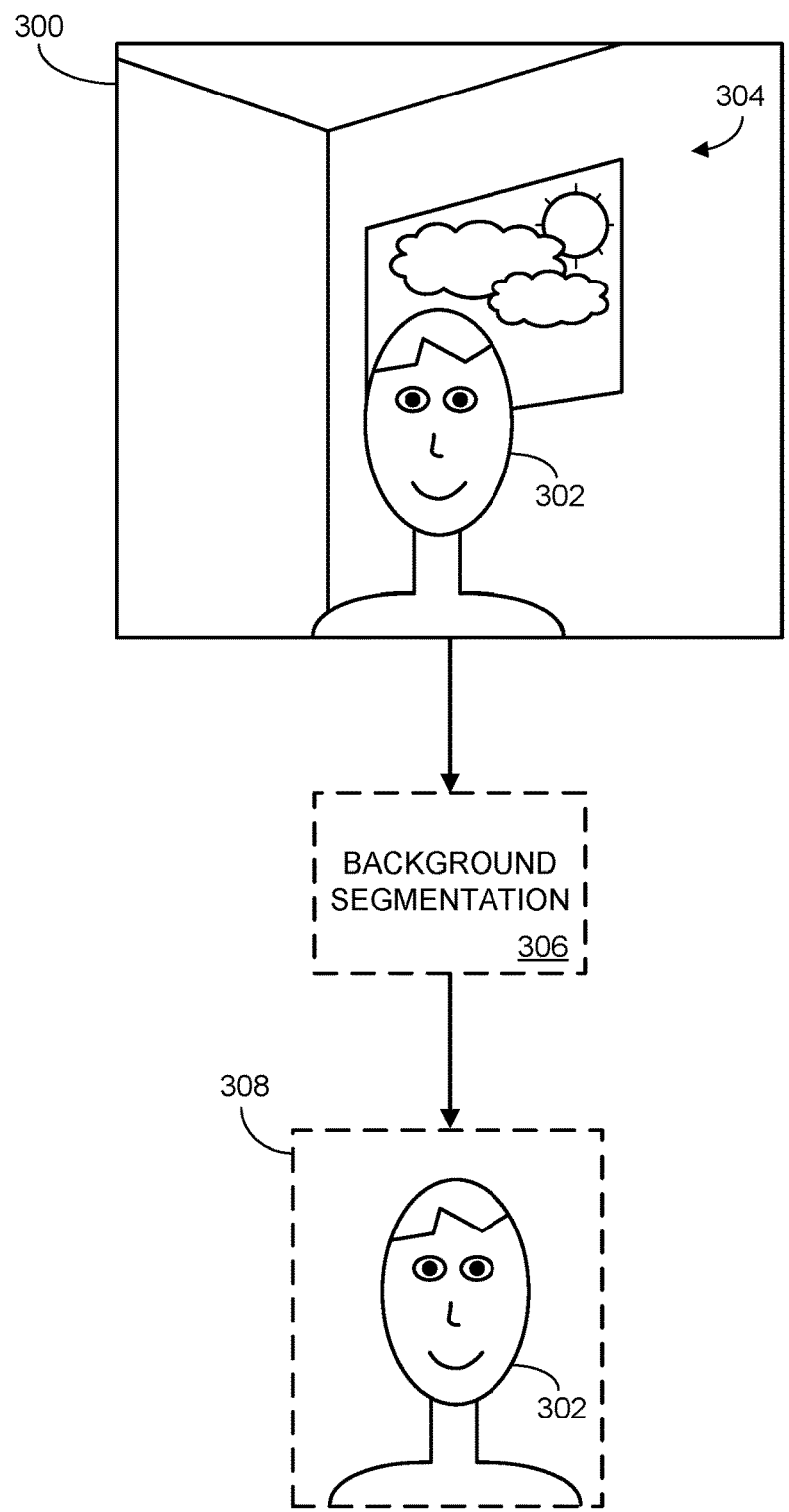
FIG. 3 schematically illustrates background segmentation of a participant video stream.

Background segmentation of a participant video stream is schematically illustrated with respect to FIG. 3. FIG. 3 schematically shows an example participant video stream 300, which depicts a human participant 302 and a real-world background 304 visible behind the real-world participant. A computing device (e.g., a client computing device capturing the participant video stream) applies a background segmentation 306 to produce a segmented video stream 308. The segmented video stream still includes a sprite depicting human participant 302, without a real-world background behind the human participant. The dashed border surrounding the human participant indicates transparency—i.e., only the sprite depicting the human participant is visible, with no background remaining. For example, the segmented participant video stream may include pixel values (e.g., RGB color values) for pixels corresponding to the sprite. Pixels corresponding to the background may be omitted, defined as transparent, or have any other suitable value.

The specific background segmentation techniques used may vary from implementation to implementation. In general, any suitable segmentation approaches or algorithms may be used. As examples, a participant video stream may be segmented into a foreground (e.g., including a sprite depicting the human participant) and a background. This may be achieved using temporal averaging, frame differencing, applying a mean filter, running a Gaussian average, face/body recognition via previously-trained machine learning classifier(s), and/or via other suitable techniques. Once the background is identified, it may be subtracted from the participant video stream to produce a segmented participant video stream.

Returning to FIG. 2, at 204, method 200 includes recognizing one or more priority parameters for each of the plurality of human participants. A "priority parameter" may include data that is relevant to determining a "cumulative participant priority" for the participant with respect to the ongoing video call. As discussed above, video calling interfaces often display video streams corresponding to different human participants at somewhat arbitrary positions, and these positions often tend to shift or change as the call progresses and participants join or leave. As will be described in more detail below, priority parameters for each of the plurality of human participants may be used to compute a cumulative participant priority for some to all of the participants, and one or more of the human participants may be ranked according to their cumulative participant priority. Segmented participant video streams corresponding to the one or more ranked human participants may then be displayed at positions within a virtual conference view corresponding to the one or more ranked participants' respective cumulative priorities.

A variety of different types of data may be used as "priority parameters" for human participants in a video call, and such data may be retrieved from any variety of suitable sources. As one example, the one or more priority parameters for each human participant may include a position of the human participant within an organizational hierarchy. For example, one participant in an ongoing video call may have a leadership or management role within a larger organization (e.g., team, business, corporation, government). Such a role may be recorded in a network-accessible organizational-graph, for example. The role, as retrieved from such a graph and/or other data source may contribute to that participant having a higher cumulative priority than other participants without such leadership or management roles.

As another example, the one or more priority parameters may include social relationships between each of the plurality of human participants and a human presenter in the ongoing video call. For in-person gatherings such as lectures, conferences, meetings, presentations, etc., that feature a speaker, lecturer, presenter, or other individual with a prominent role, individuals with social relationships with the presenter often choose to position themselves in relatively close proximity to the presenter (e.g., by sitting in the front row). Similarly, in in-person gatherings, participants having social connections with each other often group themselves together (e.g., by sitting or standing near each other). Such social connections can include membership in a same team or group, having a same role or function, having a shared background or history (e.g., having attended the same school, seminar, living/working near each other), informal friendships within or outside a larger organization (e.g., workplace), etc.

Information about social relationships with a human presenter and/or other participants may be retrieved, for example, from a participant's contacts list, inferred from a frequency with which the participant contacts or collaborates with other individuals (e.g., via email, IM, video call, social media, collaboration tools), inferred from shared history (e.g., attended the same school, from the same home town, sit near each other in an office floor plan), manually specified by the participant (e.g., by defining a list of their "preferred" coworkers), inferred from a social network (e.g., which other individuals does the participant "friend" or "follow" on social media), and/or retrieved from any other suitable data source. Thus, consideration of such social relationships during an ongoing video call may help to better emulate the feeling of in-person gatherings during video calls.

As another example, the one or more priority parameters may include a consideration as to whether each particular human participant is likely to participate in the ongoing video call. For instance, the one or more priority parameters may include a history of prior meeting participation for each of the plurality of human participants, such that participants who have a history of participating in prior meetings have a higher priority than participants who do not actively participate. Such information may be retrieved, for example, from a database maintained by a video calling service that lists a prior video call history for one or more participants, from a profile stored on the participant's client computing device, manually specified by the participant, etc.

Additionally, or alternatively, each participant may be asked upon accepting a call invitation, and/or joining a video call, whether they intend to be an active participant in the meeting or simply observe. The answer to such a query may be recorded as a priority parameter—e.g., a binary result stating that "yes" the user is likely to participate, or confidence value stating, for example, that the user is 70% likely to participate. Furthermore, in cases where a video call specifies optional and mandatory attendees, each participant's optional vs mandatory status may be recorded as a priority parameter.

As another example, the priority parameters may include information relating to each participant's knowledge of, or relevance to, a meeting topic. For example, during a meeting regarding development of a specific product, participants having educational degrees in a corresponding field (e.g., mechanical engineering) may be given a higher priority than individuals with less knowledge of the subject matter in discussion. Again, such information may be retrieved from any suitable source—e.g., from a user profile held on the client computing device or server computing device, from an external information source (e.g., a human resources database, a social network), or manually specified by a user (e.g., during a pre-meeting questionnaire).

Additionally, or alternatively, the system may prioritize consistency of participant positioning from one video call to another. For example, during in-person gatherings, participants may often choose to position themselves in similar places from one gathering to the next. Accordingly, the priority parameters may include information regarding the positions at which one or more human participants were displayed during one or more prior video calls. For example, during each video call, the server computing system may store information regarding the positioning of one or more human participants (e.g., as two-dimensional or three-dimensional virtual coordinates, or at a discrete position or "seat" within a virtual conference view). During a future video call, the server computing system may retrieve such positioning information, and optionally weigh participants' prior positions during prior video calls to determine where one or more participants should be positioned within a virtual conference view. In this manner, video calling may more effectively simulate in-person gatherings, where participants often develop personal seating/positioning habits. This may help communication and collaboration via video calls feel more natural and efficient to the human participants.

For the purposes of this disclosure, "recognizing" a priority parameter may include retrieving a priority parameter from any suitable source. This is schematically illustrated with respect to FIG. 4, again showing server computing system 110. In this example, the server computing system maintains a participant profile 400 including one or more priority parameters 402A for a particular human participant. This may, for example, take the form of a user profile or account maintained by a video calling service enabling the video call, and include information relating to the human participant's attendance of, and participation in, prior video calls.

Figure 4:
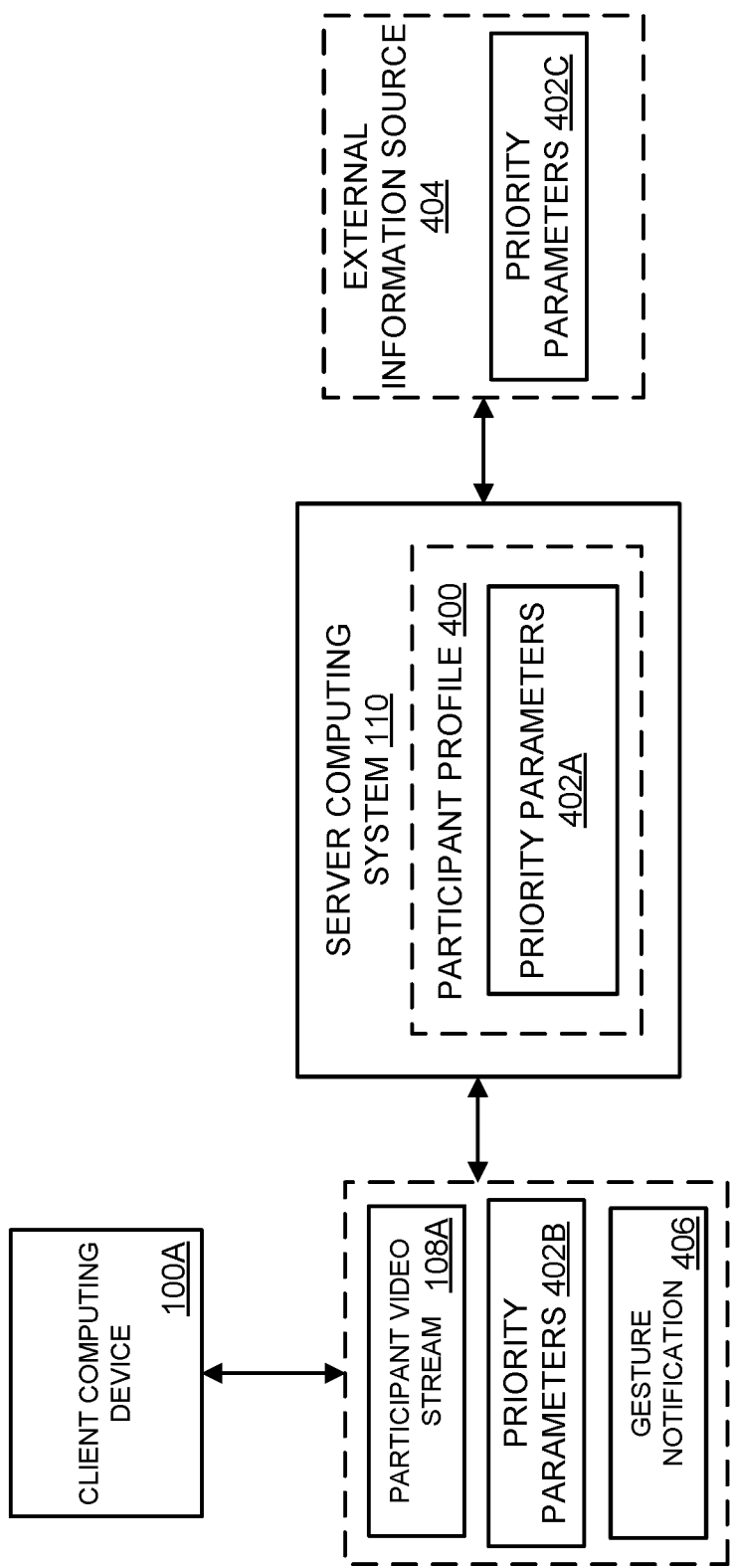
FIG. 4 schematically illustrates a server computing system recognizing priority parameters for a human participant in a video call.

FIG. 4 also schematically shows participant video stream 108A received by the server computing system from client computing device 100A. In FIG. 4, however, the client computing device also sends one or more priority parameters 402B, which may include any information stored by the client computing device relevant to determining a cumulative participant priority for the human participant. For example, priority parameters 402B may include information regarding the participant's answers to a questionnaire, relationships with other participants, or position within an organizational chart. Additionally, or alternatively, the client computing device may transmit a unique user identifier useable by the server computing device to retrieve relevant priority parameters from another suitable source—e.g., a database maintained by the server computing device, or an external information source.

Furthermore, in FIG. 4, the server computing system also accesses one or more priority parameters 402C from an external information source 404. The external information source may take the form of any external service or database that stores data relevant to determining a human participant's cumulative participant priority. In one example, the external information source may take the form of a social media network, and the priority parameters may relate to the human participant's social or professional connections with other meeting participants.

Returning to FIG. 2, at 206, method 200 includes ranking one or more human participants of the plurality of human participants based on a cumulative participant priority for each of the human participants, each of the cumulative participant priorities based on the one or more priority parameters for the human participants. This is schematically illustrated with respect to FIG. 5, which shows three different human participants 500A, 500B, and 500C in an ongoing video call ranked according to their cumulative participant priority. Specifically, human participant 500A is ranked as "priority 1" based on a cumulative participant priority 502A, which is in turn based on a set of at least two priority parameters 504A for participant 500A. Similarly, participants 500B and 500C are respectively ranked as "priority 2" and "priority 3" according to cumulative participant priorities 502B and 502C, which in turn are based on sets of two or more priority parameters 504B and 504C.

In general, a server computing system may rank one or more human participants according to their cumulative participant priority. In the specific example of FIG. 5, at least three human participants are ranked, although this is not limiting. In some implementations, all of the plurality of human participants in the ongoing video call may be ranked based on their cumulative participant priorities.

The various priority parameters recognized for each human participant may be weighted or combined in any suitable manner to derive each participant's cumulative participant priority. For instance, different priority parameters for each participant may be numerically quantified and added together to give a total priority score, which may be equivalent to each participant's cumulative participant priority. These scores may then be sorted in descending order to determine each participant's overall priority. The specific values assigned to each priority parameter may vary from implementation to implementation, depending on what is desired for any particular video call. This may in some cases be manually specified by one or more human users, and/or automatically specified by the server computing system. For example, a meeting host, organizer, presenter, or other prominent individual may specify that, for a particular video call, participants who are knowledgeable about the subject matter to be discussed should be prioritized over less knowledgeable individuals. Thus, the server computing system may assign different numerical values to different priority parameters for each human participant to prioritize subject matter expertise.

In other examples, priority parameters may be aggregated into cumulative participant priorities in other suitable ways. In some examples, cumulative participant priorities may be determined based on one or more heuristics coded into the video calling service—e.g., the video calling service may be programmed to primarily prioritize participants having management or leadership roles, then secondarily prioritize participants based on their contribution likelihood.

The video calling service may in some cases support different pre-defined or user-defined video calling profiles that use different respective weightings when determining cumulative participant priority. For example, a video call using a "brainstorming" profile may primarily prioritize participants based on their knowledge of the relevant subject matter, and secondarily prioritize participants based on their expressed likeliness to contribute. By contrast, a "social" video call profile may prioritize participants based on their known social relationships—e.g., based on email/IM exchanges, social media connections, and proximity within a building floorplan. Similarly, a "lecture" or "presentation" video call may prioritize participants based on their history of interaction with the specific presenter (e.g., based on email exchanges or shared history), and secondarily prioritize participants based on their history of participation in previous presentations. In a "management" video call, any managers or team leaders may be automatically assigned the highest cumulative participant priorities. It will be understood that these examples are non-limiting.

In some cases, different prioritization heuristics or rules may be applied for different specific positions or groups within a virtual conference view. For example, as will be described in more detail below, different participants may be arranged within a virtual conference view as a plurality of separate groups—e.g., rows. One or more groups and/or specific positions within the virtual conference may be reserved for the X highest-priority or lowest-priority participants in the video call. Additionally, or alternatively, different specific groups and/or positions may be reserved for participants having specific priority parameters, and/or combinations of parameters, without regard to the participant's overall cumulative priority. For example, one row in a virtual conference interface may be reserved for any participants with a "management" organizational role, regardless of such participants' cumulative priorities.

Additionally, or alternatively, participant prioritization may be assessed by a suitable machine learning model. For example, a machine learning model may be trained on a plurality of prior video calls between various human participants. Input data for the machine learning model may include the number of participants, the length of the video call, a number of participants who leave while the video call is ongoing, a perceived productivity or efficiency of the video call (e.g., based on a post-call questionnaire, or an analysis of a transcript of the call), an inferred emotional sentiment of each participant (e.g., based on a post-call questionnaire, or a visual analysis of participant facial expressions during the call), an inferred level of engagement from each participant (e.g., based on how much each participant speaks, or an analysis of each participant's gaze direction to determine their focus vector), and/or other suitable priority parameters for each participant, Such data may be labeled in a supervised or unsupervised training phase with labels specifying desired positions at which each participant should be displayed in the virtual conference view. Based on analysis of such training data, the machine learning model is configured to dynamically weight myriad priority parameters for each participant to assign each participant a different cumulative participant priority and/or view location during a particular video call. Such a machine learning model may be continuously retrained and refined as additional video calls are conducted, e.g., via a feedback loop allowing participants and/or presenters to judge the appropriateness of participant placement. Examples of suitable machine learning and artificial intelligence techniques are described below with respect to FIG. 9.

In any scenario where a computing system automatically prioritizes human participants based on some weighting of various priority parameters, such prioritization may in some cases be influenced or overridden by a human user. For example, in the event that one or more human participants, presenters, call hosts, organizers, administrators, or other human users, are dissatisfied with the prioritization of one or more participants, they may manually rank or prioritize human participants according to their personal criteria. Additionally, or alternatively, such a human user may specify prioritization preferences that may affect automatic prioritization of human participants, without explicitly ranking individual participants themselves.

In some cases, a participant's cumulative participant priority may change during the course of an ongoing video call. For example, this may occur based on the participant's behaviors during the call (e.g., their level of engagement), and/or when the server computing system recognizes additional or changed priority parameters for the participant that affects an earlier priority calculation. In the event that a participant's overall priority ranking changes during the course of an ongoing video call, the server computing system may or may not change the position at which the participant is displayed within a virtual conference view. In some cases, one or more positions within a virtual conference view may be reserved for participants having specific priority levels, and/or for specific individuals. For example, one position within the virtual conference view may be reserved for the highest-priority participant, and the participant displayed at this position may change over the course of the video call as participant priorities change. Additionally, or alternatively, one or more positions may be reserved for specific individuals (e.g., a team leader), and such positions may remain fixed even as participant priorities change and various participants join or leave the video call.

Returning to FIG. 2, at 208, method 200 includes compositing the plurality of segmented participant video streams into a virtual conference view. Notably, the virtual conference view may display each of one or more ranked human participants at virtual positions based on their cumulative participant priority, such that human participants having higher cumulative participant priorities are displayed more prominently than human participants having lower cumulative participant priorities.

Figure 6:
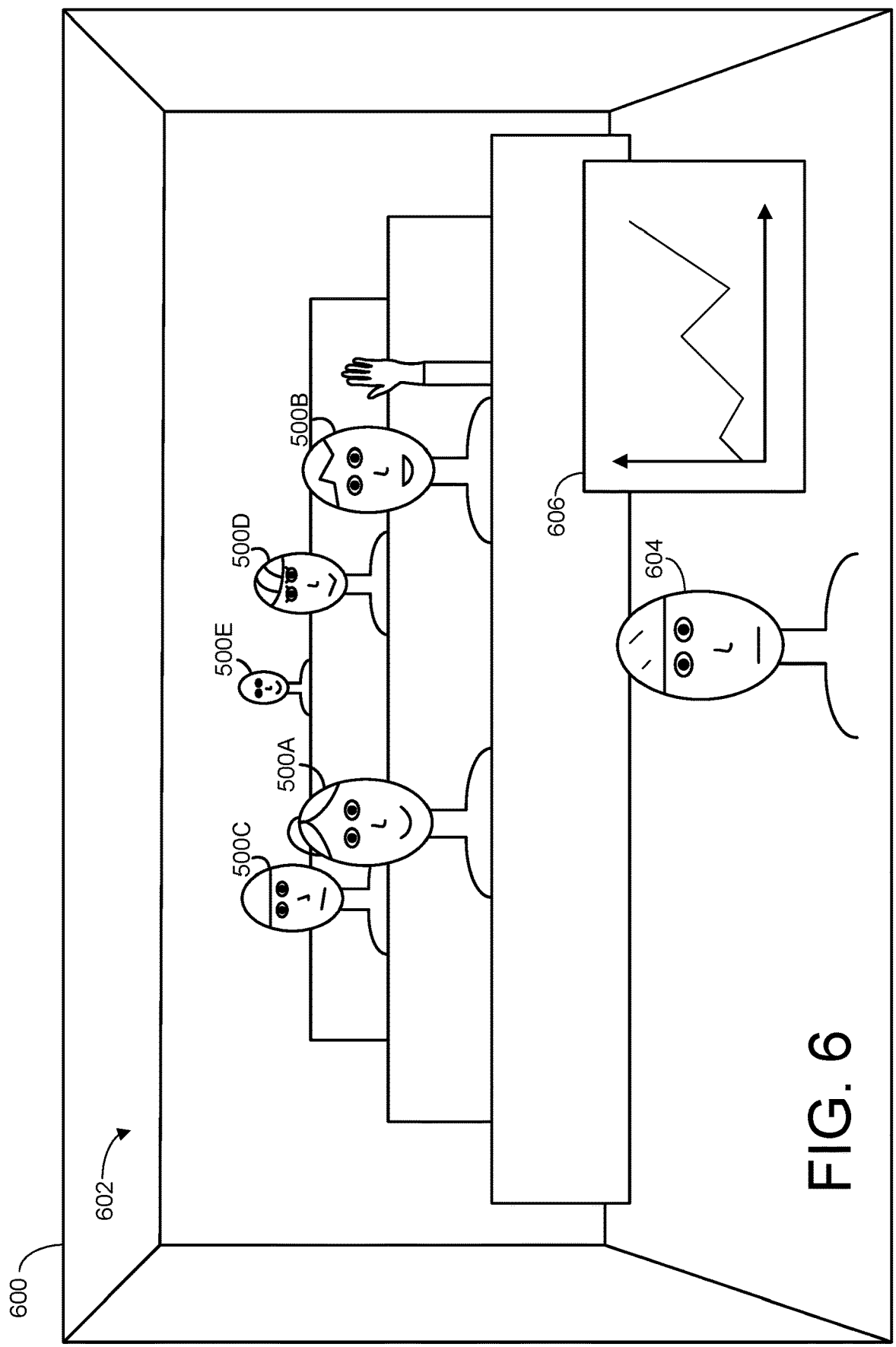
FIG. 6 schematically illustrates an example virtual conference view.

This is schematically illustrated with respect to FIG. 6, which shows an example virtual conference view 600. Segmented participant video streams corresponding to human participants 500A, 500B, and 500C from FIG. 5, as well as additional participants 500D and 500E, are composited over a virtual auditorium backdrop 602 such that, within the virtual conference view, each of the plurality of human participants appears to occupy a virtual position within the virtual auditorium backdrop.

Furthermore, it will be understood that virtual auditorium backdrop 602 is not limiting. Segmented participant video streams may be composited over any suitable backdrop or other visual content and/or otherwise composited in any desired arrangement. As examples, other backdrops may resemble classrooms, conference rooms, performance venues (e.g., concert halls), athletic stadiums, etc. Furthermore, segmented participant video streams need not be composited over any specific visual content, but rather may be composited over a blank backdrop, e.g., arranged on a virtual sphere that can be rotated to see different participants.

A total of five human participants are represented in FIG. 6. As discussed above, however, a server computing system may receive any number of different segmented participant video streams, which may all be composited into a virtual conference view. Thus, a virtual conference view may include tens, hundreds, thousands, or more individual video streams corresponding to different human participants.

In FIG. 6, video streams corresponding to the various human participants are displayed at different positions within the virtual conference view. In some cases, audio corresponding to the various video streams may additionally be spatially-localized. In this manner, when the virtual conference view is displayed by a client computing device, audio corresponding to each human participant may be spatially-localized such that it seems to originate from a position corresponding to each participant's position within the virtual conference view. Any suitable audio mixing and localization techniques may be used.

In FIG. 6, the one or more ranked human participants 500A, 500B, and 500C are displayed at virtual positions within the virtual conference view corresponding to their cumulative participant priorities. In this example, participants 500A and 500B are shown at positions having higher prominence than other participants 500C-E, given that participants 500A and 500B are the highest-priority participants. Human participant 500C, having a lower cumulative participant priority than participants 500A and 500B, is shown at a position having less prominence.

In other examples, however, different priority rankings may correspond to different positions within the virtual conference view. For example, rather than placing the highest-ranked participants toward the front of the virtual conference view as in FIG. 6, highest-ranked participants may be placed toward the center of the overall plurality of meeting participants, or at other suitable positions. In other words, in FIG. 6, the rows closer to the front have higher prominence. In other examples, however, other positions within a virtual conference view may be considered as having higher prominence. For example, human participants may be arranged in a "totem pole," or "pyramid" configuration, in which positions toward the top have higher prominence than positions toward the bottom.

Additionally, or alternatively, placement of human participants within a virtual conference view based on priority may consider the lowest-priority participants in addition to, or instead of, the highest-priority participants. For instance, when compositing the plurality of segmented participant video streams, one or more streams corresponding to the lowest-priority participants may be displayed at positions of lower prominence than other participants in the plurality (e.g., toward the back). As will be described in more detail below, each participant's respective position within the virtual conference view may in some cases affect their relative size. In this example, the lower-priority participants displayed toward the back have a smaller size than higher-priority participants displayed toward the front.

The remaining participants 500D and 500E may or may not be ranked according to their cumulative participant priority. In other words, the plurality of segmented participant video streams may in some cases be composited such that the virtual conference view displays all of the plurality of segmented participant video streams at virtual positions corresponding to their cumulative participant priority. Alternatively, one or more of the plurality of human participants may not be ranked according to their priority. Or, all participants may be ranked, but only some participants may be displayed at positions corresponding to their cumulative participant priorities.

Any participants not displayed according to their priority may be displayed at positions within the virtual conference view selected according to other criteria. For example, such positions may be selected by the individual participants, selected by a meeting host/organizer/presenter, determined based on order-of-arrival, etc. In some cases, participant placement may be based at least in part on an arrangement or configuration of the virtual conference view. For example, the virtual conference view may reserve some number of positions (e.g., 3) for the highest-priority participants, while other positions may be filled according to other criteria—e.g., first-come first-serve, presenter choice, participant choice, based on team membership, social relationships, name alphabetization, and/or any combination of various factors, each of which may be differently weighted to determine placement for each participant.

In some cases, the server computing system may be configured to arrange the plurality of segmented participant video streams into a plurality of separate groups within the virtual conference view, where each separate group has a different apparent distance away from a virtual camera position. In this manner, segmented participant video streams in groups that are relatively closer to the virtual camera position may have a larger size than segmented participant video streams in groups that are relatively farther away from the virtual camera position.

In the example of FIG. 6, the plurality of segmented participant video streams are arranged into three separate groups. Video streams in groups closer to the virtual camera position (in this example, closer to the bottom of the page) have a larger size than groups farther away from the virtual camera position. Thus, participants 500A and 500B are displayed with a larger size than participant 500E. Furthermore, in this example, the ranked one or more human participants are the highest-priority participants (i.e., human participants 500A and 500B), and are arranged in a closest group to the virtual camera position. As discussed above, however, participants may be placed at various suitable positions within a virtual conference view depending on their priority, and such positioning may vary depending on the implementation.

In some cases, human participants may occlude those positioned behind them from the perspective of the virtual camera. For example, in FIG. 6, human participant 500A partially occludes human participant 500C. Occlusions may be handled in any suitable way. It may generally be desirable to composite the virtual conference view from back to front—i.e., participants relatively far from the virtual camera position may be drawn first, then overwritten with any participants relatively closer to the virtual camera position. In this manner, human participants relatively closer to the virtual camera position occlude participants who are relatively further from the camera position, and not vice versa. This may provide the illusion that the plurality of human participants are actually present in a real environment, as imaged by a real camera.

The plurality of separate groups are depicted in FIG. 6 as being horizontally-aligned rows. In this manner, they imitate auditorium or theater-style seating, in which each successive row is disposed above and behind its preceding row. In other examples, however, the plurality of separate groups may be represented in other suitable ways. For example, the plurality of separate groups may imitate circus or stadium-style seating, in which participants are placed in a sequence of rings that encircle a central space. In other examples, each separate group may be a vertically-aligned column, a spatially-distinct cluster, or other suitable grouping.

In addition to the plurality of segmented participant video streams, the server computing system may in some cases receive a segmented presenter video stream from a client computing device corresponding to a human presenter participating in the video call. From there, the segmented presenter video stream may be composited with the plurality of segmented participant video streams, such that the segmented presenter video stream is displayed within the virtual conference view differently from the plurality of segmented participant video streams.

This is also schematically illustrated in FIG. 6, in which a segmented presenter video stream corresponding to a human presenter 604 is composited within virtual conference view 600 along with the plurality of segmented presenter video streams corresponding to human participants 500A-500E. In FIG. 6, the human presenter is displayed differently from the plurality of human participants, in that the human presenter is displayed at a different position within the virtual conference view, away from the plurality of separate groups into which the participants are arranged. This helps to provide the impression that the human presenter is giving a presentation to an audience seated in an auditorium.

In general, however, a human presenter may be displayed "differently" from a plurality of human presenters within a virtual conference view in any number of different ways. As in FIG. 6, a virtual conference view may include different "presenter" and "audience" portions, in which the presenter is displayed at a position that is distinct from the position(s) at which the participants are displayed. The "presenter" and "audience" portions of the virtual conference view may, for example, be separated by a split screen.

In some cases, the virtual conference view may include a virtual screen, and any notes, documents, or "screen-share" content provided by participants and/or a meeting presenter may be displayed on the virtual screen. FIG. 6 includes an example virtual screen 606, presented within the virtual conference view near presenter 604, and displaying visual content related to the ongoing video call. In other examples, the virtual screen may have other suitable sizes and positions with respect to the virtual conference view. Furthermore, the position and/or size of the virtual screen may change over the course of the video call. For example, the position of the virtual screen may change to be close to any participant/presenter currently sharing content on the screen. Additionally, or alternatively, the size of the virtual screen may change depending on whether it is currently in use. For example, when a presenter/participant is actively sharing content to the virtual screen, the size of the virtual screen may increase to take up a greater portion of the virtual conference view (up to 100% of the virtual conference view). Similarly, if no one is currently sharing content to the virtual screen, the relative size of the virtual screen may decrease (e.g., to as low as 0% of the virtual conference view).

In another example, the presenter and participants need not be displayed in the virtual conference view at the same time. Rather, depending on who is currently speaking, the virtual conference view may change to depict either the presenter or plurality of participants. For example, rendering of the virtual conference view may change to imitate panning and/or zooming of a virtual camera to focus on a different portion of the virtual environment—e.g., when a participant begins speaking, the virtual camera may pan away from the presenter to focus on the participant. In other words, each of the plurality of human participants, the human presenter, the virtual screen, and/or other virtual elements may be assigned virtual three-dimensional (3D) coordinates. The virtual camera may therefore be panned and/or zoomed to frame different aspects of the virtual conference view (e.g., all participants, the presenter only, one or more specific participants only, or the virtual screen only). In some cases, the virtual conference view may comprise a hybrid view that overlays some elements over others—e.g., the presenter and/or virtual screen may be permanently and/or temporarily overlaid over a larger audience view.

Regardless of whether a human participant is present, the server computing system may in some cases be configured to detect that a particular human participant of the plurality is currently speaking, and visually emphasize the particular human participant within the virtual conference view. Such visual emphasis may take a variety of suitable forms.

In one example, visually emphasizing a currently-speaking human participant may include displaying a segmented participant video stream corresponding to the speaking human participant with a higher resolution than other segmented participant video streams corresponding to other human participants. In other words, each of the segmented participant video streams received by the server computing system may have a same or different resolution.

In some cases, each client computing device may provide a participant video stream having a resolution requested by the server computing system. Thus, for participants who are relatively low priority, and/or who are not actively participating in the video call, the server may request video streams having relatively low resolution to conserve bandwidth. Upon detecting that a particular human participant is currently speaking, the server computing system may request a higher-resolution segmented participant video stream from a client computing device corresponding to the particular human participant.

Additionally, or alternatively, the resolution of one or more segmented participant video streams may be changed at other suitable times and for other suitable reasons. For example, the server computing device may request relatively higher or lower resolution video streams for different participants based on their cumulative participant priorities, with or without regard to whether such participants are currently speaking. In other words, one or more high-priority human participants may be persistently represented using high resolution video streams, even if they are not speaking. Any lower-priority human participants may be depicted using lower-resolution video streams, although may be switched to a higher-resolution stream if they begin speaking, their relative priority increases, or for other reasons. In cases where the ongoing video call includes a presenter, the resolution of the presenter's video stream may differ from (e.g., have a higher resolution than) video streams for the plurality of meeting participants.

In other examples, a currently-speaking human participant may be visually emphasized in other suitable ways. For example, visually-emphasizing a speaking human participant may include one or both of panning and/or zooming a virtual camera view to increase a visibility of the particular human participant within the virtual conference view. This is schematically illustrated with respect to FIG. 7, which shows an updated virtual conference view 700. In this example, the server computing system has determined that human participant 500B has begun speaking. Thus, the server computing system updates rendering of the virtual conference view to imitate both panning and zooming of a virtual camera to focus on human participant 500B, thereby increasing the visibility of participant 500B within the virtual conference view.

In some cases, such changes in the virtual conference view may also correspond to changes in the video stream resolution for any affected human participants. For example, in FIG. 7, human participant 500B is currently speaking and thus may be depicted using a relatively higher-resolution video stream. By contrast, human participant 500D is not currently speaking, and yet may nonetheless also be depicted using a relatively higher-resolution video stream due to their increased size within the current virtual conference view. Similarly, because human participants 500A, 500C, and 500E are not currently visible in the virtual conference view, the server computing system may request a temporary suspension of video streams for such participants until those participants once again are in view.

A server computing system may detect that a particular human participant is speaking in any number of suitable ways. In one example, a client computing device, and/or server computing system, may detect that the volume of an audio stream associated with a particular participant has increased. The client computing device and/or server computing system may optionally perform analysis/processing on the audio stream to distinguish an increase in audio caused by human speech from an increase in audio caused by an increase in microphone gain, or an increase in volume caused by background noise, as examples. For example, an audio waveform may be analyzed to determine whether it is consistent with a frequency/register consistent with human speech, or consistent with a prior voice sample captured for that human participant. In some cases, an audio stream may be compared to a video stream for a participant—e.g., to determine if visual movements of the participant's lips correspond to sounds detected in a corresponding audio stream. The client computing device and/or server computing system may optionally apply suitable artificial intelligence and/or machine learning techniques to detect a current speaker. For example, if a previously-trained speech to text machine learning model successfully transcribes text from an audio stream corresponding to a particular participant with above a threshold confidence (e.g., 95%), then that participant may be determined to be currently speaking and visually emphasized. Examples of suitable machine learning and artificial techniques are described below with respect to FIG. 9.

Additionally, or alternatively, a currently-speaking human participant may be visually-emphasized in other suitable ways. As additional examples, the server computing system may increase a size of the speaking human participant compared to other human participants. The server computing system may increase a brightness of the speaking human participant, and/or decrease a brightness of non-speaking human participants, to imitate shining a spotlight on the speaking participant. The server computing system may render a border or outline around the speaking participant. The segmented participant video stream corresponding to the speaking participant may be displayed or projected onto a virtual screen—e.g., virtual screen 606. This may give the illusion that a cameraman has zoomed in on a particular participant or audience member, and may improve the visibility of the participant for any viewers of a live or recorded version of the video call. It will be understood that these examples are non-limiting, and that a speaking human participant may be visually emphasized in any number of ways.

In the event that a human participant leaves the ongoing video call, the server computing system may respond in various suitable ways. For example, once a human participant leaves, the human participant may disappear from the virtual conference view, while leaving an empty space where they had previously been displayed. This may serve as visual feedback to other participants that a participant has left. In some cases, a participant leaving may be accompanied by a corresponding animation. For example, the segmented participant video stream may shrink down to nothing or slide toward an edge of the screen.

Alternatively, the positions of some or all participants within the virtual conference view may change if any participants leave—e.g., to fill empty spaces. In some cases, any changes to the arrangement of segmented participant video streams within the virtual conference view—e.g., caused by participants leaving—may occur when such changes are not visible within the current virtual camera view. For example, at the moment when a particular participant leaves the call, the server computing device may not update the virtual conference view to reflect the change. If, at some later time, the position of the departed participant is no longer visible within the virtual camera view—e.g., because the virtual camera has panned to emphasize a particular participant—then any changes in call attendance may be applied when the virtual camera pans back to its prior view in which such changes would be visible. For instance, the positions of other human participants may be shifted to fill a gap left by a departed participant. As another example, upon a human participant leaving, their segmented participant video stream may be replaced with a placeholder—e.g., a profile picture or avatar representing the participant, a previously-captured still frame depicting the participant, or a series of previously-received frames that are looped.

In some cases, a human participant's network connection may become unstable or may be disrupted during the ongoing video call. The server computing system may respond to such instability or disruption in any suitable way. In one example, the server computing system may display a still frame from the participant's video stream until such time as the participant's network connection is stabilized. As another example, the server computing system may loop a series of previously-received frames for the participant, or add artificial animation to a still frame, to provide the impression that the participant is still present and moving.

In some cases, the server computing system may be configured to respond to gestures performed by participants in an ongoing video call. As with background segmentation, it may generally be desirable for gesture detection to be performed by the individual client computing devices capturing the video streams of the various human participants. This is due to the fact that it may be computationally taxing for the server computing system to simultaneously monitor all of the segmented participant video streams for gestures.

When gesture detection is performed by the client computing devices, the server computing system may receive a gesture notification from a client computing device, indicating that the client computing device has detected that a corresponding human participant has performed a recognized gesture. For example, the server computing system may maintain a gesture API that defines one or more predefined gestures that the server computing system and/or video calling service are configured to respond to. Thus, regardless of how each individual client computing device performs gesture recognition, the server computing system may be notified of any recognized gestures via standardized API calls. In FIG. 4, server computing system 110 receives a gesture notification 406 from client computing device 100A, indicating that the client computing device has detected a gesture performed by a corresponding human participant. In general, however, gesture recognition may be performed by either or both of the client and server computing systems.

Computing devices may be configured to detect any number of different recognized gestures using any suitable gesture recognition approaches or algorithms. For instance, a computing device may be configured to use suitable artificial intelligence techniques, such as one or more trained machine learning classifiers, to recognize gestures. In other words, a client computing device may be configured to apply a machine learning analysis to a segmented participant video stream to detect a gesture performed by a human participant. Examples of suitable machine learning and artificial intelligence techniques are described below with respect to FIG. 9. Examples of recognizable gestures include hand raising, hand waving, "thumbs up," "thumbs down," head nodding, head shaking, winking, blowing a kiss, drawing a heart, etc. In some cases, the server computing system may be configured to respond differently to gestures performed by a participant's left-hand vs the participant's right-hand.

Upon detecting that a gesture has been performed (e.g., after receiving a gesture notification), the server computing system may be configured to perform a gesture response action based on the gesture notification. The gesture response action may take any number of suitable forms, and will often depend on the specific type of gesture that was recognized. As one example, the gesture response action may include displaying an animation at or near a position of the participant video stream corresponding to the participant who performed the recognized gesture.

Figure 7:
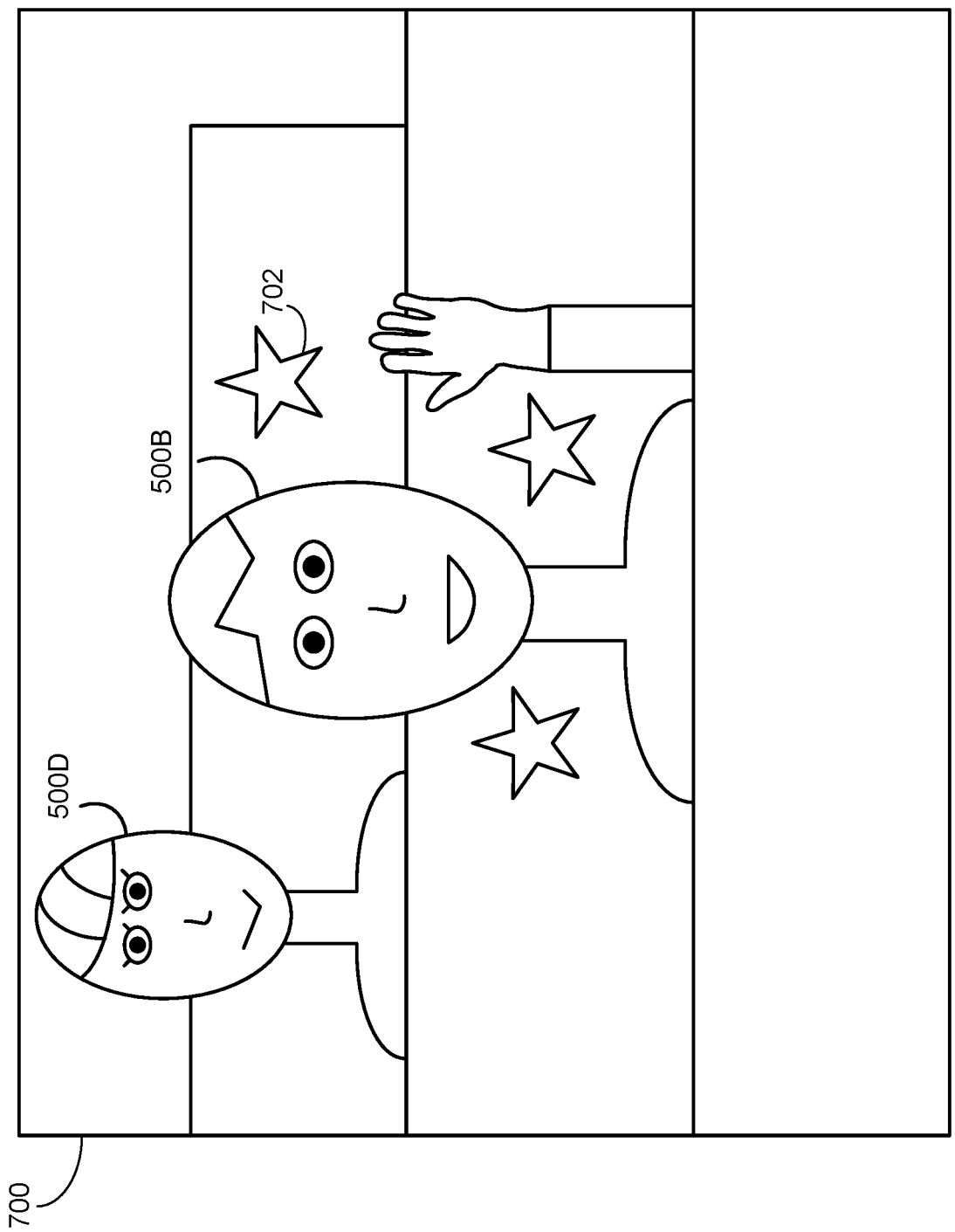
FIG. 7 schematically illustrates a human participant virtually emphasized by a server computing system in a virtual conference view.

This is also illustrated in FIG. 7, in which the server computing system has received a gesture notification indicating that human participant 500B has raised his hand. In response, the server computing system displays a star animation 702 at a position proximate to the segmented participant video stream depicting human participant 500B. It will be understood that the star animation depicted in FIG. 7 is non-limiting, and that any number of different animations may be displayed in response to any number of different recognized gestures.

Additionally, or alternatively, the gesture response action may take other suitable forms. As additional examples, the gesture response action may include muting or unmuting a human participant, changing display of the virtual conference view to increase or decrease prominence of the human participant, removing the human participant from the video call, registering a vote "yes" or a vote "no" for the participant, etc.

For example, the server computing system may be configured to poll the plurality of human participants in the ongoing video call (e.g., in response to a polling request received from a participant and/or presenter in the call). During polling, any or all of the plurality of human participants may perform responsive gestures (e.g., a "thumbs up" for yes or a "thumbs down" for no). Such gestures may be detected by client computing devices corresponding to the participants, and indications of detected gestures may be received by the server computing device. Results of the poll may be aggregated and stored and/or displayed in any suitable manner. For example, results of the poll may be displayed privately to a participant/presenter who requested the poll, results may be displayed publicly as part of the virtual conference view (e.g., integrated into a virtual screen 606), results may be transmitted to one or more participants or other parties via a messaging system (e.g., email or IM), and/or poll results may be handled in other suitable ways.

Returning to FIG. 2, at 210, method 200 includes sending the virtual conference view for display by the plurality of client computing devices. This is schematically illustrated with respect to FIG. 1. Specifically, in FIG. 1, client computing device 100A receives a virtual conference view 112A for display on display device 101. Similarly, client computing devices 100B, 100C, and 100D receive virtual conference views 112B, 112C, and 112D for display.

Figure 8:
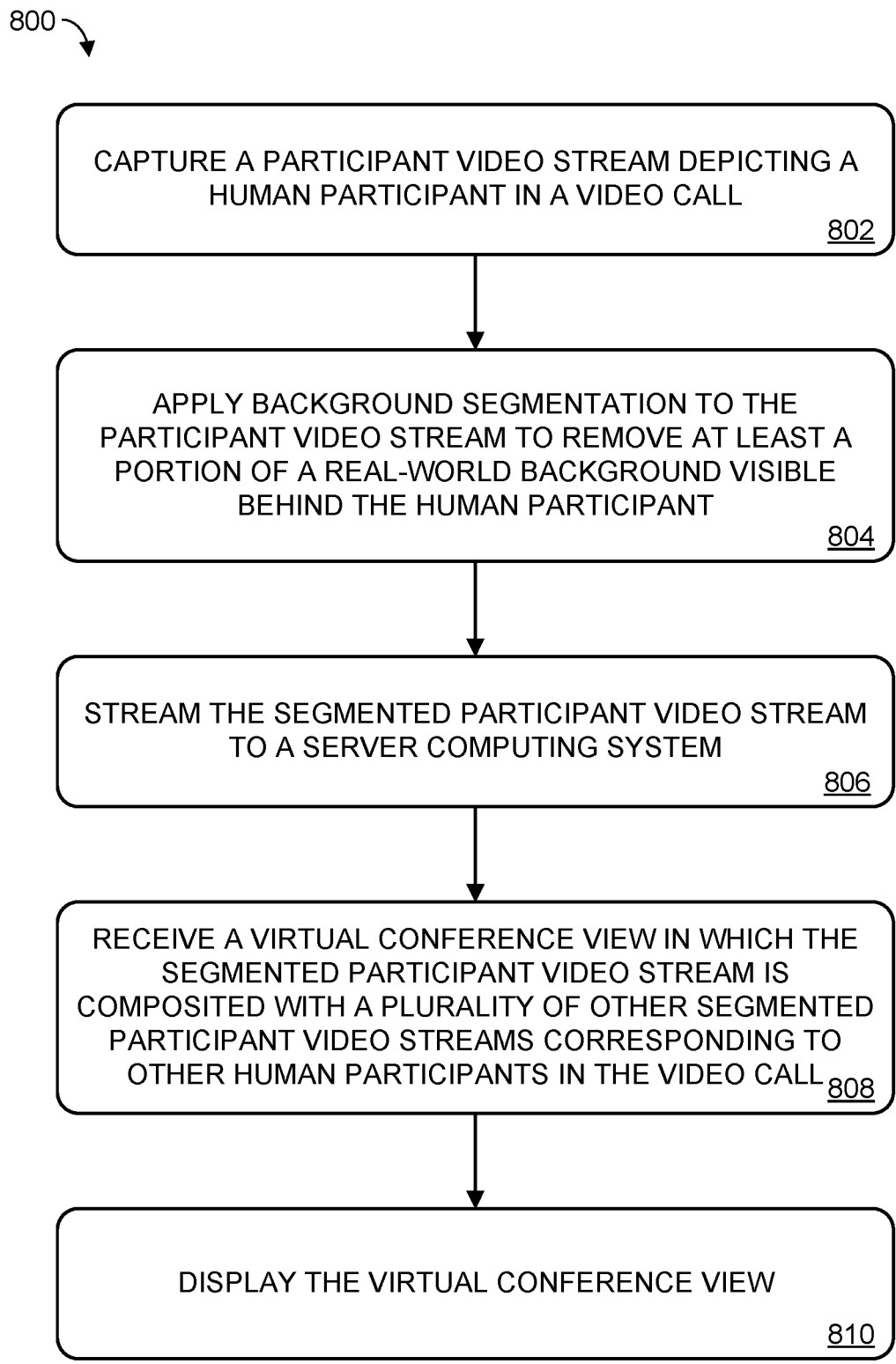
FIG. 8 illustrates an example, client-side method for video calling.

The present disclosure has thus far primarily focused on actions taken by the server computing system. FIG. 8 illustrates an example method 800 for video calling, focusing on steps performed by a client computing device. Method 800 may be implemented on any suitable computing device having any suitable hardware configuration and form factor. In some examples, method 800 may be implemented by any or all of client computing devices 100A-D of FIG. 1, and/or computing system 900 described below with respect to FIG. 9.

At 802, method 800 includes capturing a participant video stream depicting a human participant in a video call. This may be done substantially as described above with respect to FIG. 1, as client computing device 100A uses a camera 104 to capture a participant video stream 108A of a human participant 102.

At 804, method 800 includes applying background segmentation to the participant video stream to remove at least a portion of a real-world background visible behind the human participant. This may be done substantially as described above with respect to FIG. 3, as a background segmentation 306 is applied to a participant video stream 300 to remove a real-world background 304, resulting in a segmented participant video stream 308.

At 806, method 800 includes streaming the segmented participant video stream to a server computing system. This may be done substantially as described above with respect to FIG. 1, as client computing device 100A streams participant video stream 108 to server computing system 110. Such streaming may be done over any suitable computer network including, for example, the Internet.

At 808, method 800 includes receiving a virtual conference view in which the segmented participant video stream is composited with a plurality of other segmented participant video streams corresponding to other human participants in the video call. The virtual conference view may be composited substantially as described above with respect to FIG. 6, in which one or more ranked human participants are displayed at positions within the virtual conference view corresponding to their cumulative participant priorities. Receiving of a virtual conference view may be done as described above with respect to FIG. 1, in which client computing device 100A receives a virtual conference view 112A from server computing system 110.

At 810, method 800 includes displaying the virtual conference view. The virtual conference view may be displayed on any suitable display device using any suitable display technology including, for example, display device 101 of FIG. 1.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 9:
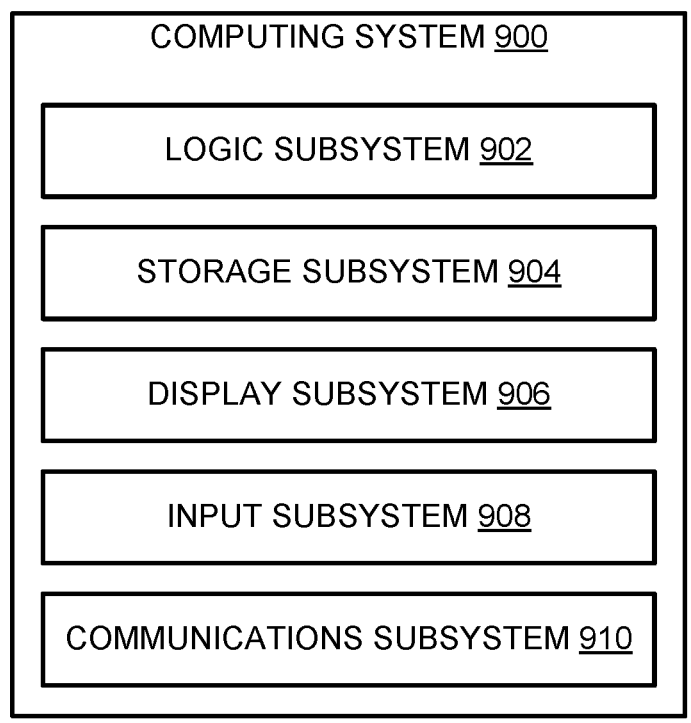
FIG. 9 schematically shows an example computing system.

FIG. 9 schematically shows a simplified representation of a computing system 900 configured to provide any to all of the compute functionality described herein. Computing system 900 may take the form of one or more personal computers, client computing devices, server computing systems, tablet computers, home-entertainment computers, gaming devices, mobile computing devices, mobile communication devices (e.g., smart phone), virtual/augmented/ mixed reality computing devices, Internet of Things (IoT) devices, and/or other computing devices.

Computing system 900 includes a logic subsystem 902 and a storage subsystem 904. Computing system 900 may optionally include a display subsystem 906, input subsystem 908, communication subsystem 910, and/or other subsystems not shown in FIG. 9.

Logic subsystem 902 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 904 includes one or more physical devices configured to temporarily and/or permanently hold computer information such as data and instructions executable by the logic subsystem. When the storage subsystem includes two or more devices, the devices may be collocated and/or remotely located. Storage subsystem 904 may include volatile, nonvolatile, dynamic, static, read/write, read-only, random-access, sequential-access, location-addressable, file-addressable, and/or content-addressable devices. Storage subsystem 904 may include removable and/or built-in devices. When the logic subsystem executes instructions, the state of storage subsystem 904 may be transformed—e.g., to hold different data.

Aspects of logic subsystem 902 and storage subsystem 904 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Such techniques may in some cases be useable to detect gestures performed by human participants in a video call, as described above. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 906 may be used to present a visual representation of data held by storage subsystem 904. This visual representation may take the form of a graphical user interface (GUI). Display subsystem 906 may include one or more display devices utilizing virtually any type of technology. In some implementations, display subsystem may include one or more virtual-, augmented-, or mixed reality displays.

When included, input subsystem 908 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 910 may be configured to communicatively couple computing system 900 with one or more other computing devices. Communication subsystem 910 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for video calling comprises: at a server computing system, receiving a plurality of segmented participant video streams from a plurality of client computing devices, each segmented participant video stream depicting a different human participant participating in a video call including a plurality of human participants; at the server computing system, recognizing one or more priority parameters for each of the plurality of human participants; at the server computing system, ranking one or more human participants of the plurality of human participants based on a cumulative participant priority for each of the plurality of human participants, each cumulative participant priority based on the one or more priority parameters for the human participant; at the server computing system, compositing the plurality of segmented participant video streams into a virtual conference view that displays each of the ranked one or more human participants at a virtual position based on their cumulative participant priority, such that human participants having higher cumulative participant priorities are displayed more prominently than human participants having lower cumulative participant priorities; and at the server computing system, sending the virtual conference view to the plurality of client computing devices. In this example or any other example, each of the plurality of segmented participant video streams include a sprite depicting a different human participant of the plurality without a real-world background behind the human participant. In this example or any other example, the method further comprises detecting that a particular human participant of the plurality is currently speaking, and visually emphasizing the particular human participant within the virtual conference view. In this example or any other example, visually emphasizing the particular human participant within the virtual conference view includes displaying a segmented participant video stream corresponding to the particular human participant with a higher resolution than other segmented participant video streams corresponding to other human participants. In this example or any other example, the method further comprises, upon detecting that the particular human participant is currently speaking, requesting a higher-resolution segmented participant video stream from a client computing device corresponding to the particular human participant. In this example or any other example, visually emphasizing the particular human participant within the virtual conference view includes one or both of panning and zooming a virtual camera view to increase a visibility of the particular human participant. In this example or any other example, the one or more priority parameters include a position of each of the plurality of human participants within a known organizational hierarchy. In this example or any other example, the one or more priority parameters include social relationships between each of the plurality of human participants and a human presenter in the ongoing video call. In this example or any other example, the one or more priority parameters include a history of prior meeting participation for each of the plurality of human participants. In this example or any other example, all of the plurality of human participants are ranked based on their cumulative participant priorities, and the virtual conference view displays all of the plurality human participants at virtual positions within the virtual conference view corresponding to their cumulative participant priorities. In this example or any other example, the method further comprises arranging the plurality of segmented participant video streams into a plurality of separate groups within the virtual conference view, where each separate group has a different apparent distance away from a virtual camera position, such that segmented participant video streams in groups that are relatively closer to the virtual camera position have a larger size than segmented participant video streams in groups that are relatively farther away from the virtual camera position. In this example or any other example, the ranked one or more human participants are one or more highest-priority human participants, and are arranged in a closest group to the virtual camera position. In this example or any other example, the plurality of separate groups are horizontally-aligned rows. In this example or any other example, the method further comprises receiving a segmented presenter video stream from a client computing device corresponding to a human presenter participating in the video call, and compositing the segmented presenter video stream with the plurality of segmented participant video streams to display the segmented presenter video stream within the virtual conference view differently from the plurality of segmented participant video streams. In this example or any other example, the method further comprises receiving a gesture notification from a client computing device indicating that the client computing device has detected that a corresponding human participant has performed a recognized gesture, based on a machine learning analysis of a corresponding segmented participant video stream depicting the corresponding human participant, and performing a gesture response action based on the gesture notification. In this example or any other example, the gesture response action includes unmuting the corresponding human participant. In this example or any other example, the gesture response action includes displaying an animation at or near a position of the corresponding participant video stream depicting the corresponding human participant. In this example or any other example, the plurality of segmented participant video streams are composited over a virtual auditorium backdrop, such that, within the virtual conference view, each of the plurality of human participants appears to occupy a virtual position within the virtual auditorium backdrop.

In an example, a method for video calling comprises: at a client computing device, capturing a participant video stream depicting a human participant in a video call; applying background segmentation to the participant video stream to remove at least a portion of a real-world background visible behind the human participant, resulting in a segmented participant video stream; streaming the segmented participant video stream to a server computing system; receiving, from the server device, a virtual conference view in which the segmented participant video stream is composited with a plurality of other segmented participant video streams corresponding to other human participants in the video call, the virtual conference view displaying one or more human participants at virtual positions corresponding to a cumulative participant priority for each of the one or more human participants, such that human participants having higher cumulative participant priorities are displayed more prominently than human participants having lower cumulative participant priorities; and displaying the virtual conference view.

In an example, a server computing system comprises: a logic machine; and a storage machine holding instructions executable by the logic machine to: receive a plurality of segmented participant video streams from a plurality of client computing devices, each segmented participant video stream depicting a different human participant participating in a video call including a plurality of human participants; recognize one or more priority parameters for each of the plurality of human participants; rank one or more human participants of the plurality of human participants based on a cumulative participant priority for each of the plurality of human participants, each of the cumulative participant priorities based on the one or more priority parameters for the human participant; composite the plurality of segmented participant video streams into a virtual conference view that displays each of the ranked one or more human participants at a virtual position based on their cumulative participant priority and with a resolution based on their cumulative participant priority, such that human participants having higher cumulative participant priorities are displayed more prominently and at higher resolutions than human participants having lower cumulative participant priorities; and send the virtual conference view to the plurality of client computing devices.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for video calling, comprising:
   at a server computing system, receiving a plurality of segmented participant video streams from a plurality of client computing devices, each segmented participant video stream depicting a different human participant participating in a video call including a plurality of human participants;
   at the server computing system, recognizing one or more priority parameters for each of the plurality of human participants;
   at the server computing system, ranking two or more human participants of the plurality of human participants based on a cumulative participant priority for each of the plurality of human participants, each cumulative participant priority based on the one or more priority parameters for the human participant;
   at the server computing system, compositing the plurality of segmented participant video streams into a virtual conference view that displays each of the plurality of human participants at different apparent virtual positions within a same virtual space relative to a virtual camera, the ranked two or more human participants having apparent virtual positions based on their cumulative participant priority, such that human participants having higher cumulative participant priorities are displayed at apparent virtual positions within the same virtual space that are relatively closer to the virtual camera than human participants having lower cumulative participant priorities; and
   at the server computing system, sending the virtual conference view to the plurality of client computing devices.

2. The method of claim 1, where each of the plurality of segmented participant video streams include a sprite depicting a different human participant of the plurality without a real-world background behind the human participant.

3. The method of claim 1, further comprising detecting that a particular human participant of the plurality is currently speaking, and visually emphasizing the particular human participant within the virtual conference view.

4. The method of claim 3, where visually emphasizing the particular human participant within the virtual conference view includes displaying a segmented participant video stream corresponding to the particular human participant with a higher resolution than other segmented participant video streams corresponding to other human participants.

5. The method of claim 4, further comprising, upon detecting that the particular human participant is currently speaking, requesting a higher-resolution segmented participant video stream from a client computing device corresponding to the particular human participant.

6. The method of claim 3, where visually emphasizing the particular human participant within the virtual conference view includes one or both of panning and zooming a virtual camera view to increase a visibility of the particular human participant.

7. The method of claim 1, where the one or more priority parameters include a position of each of the plurality of human participants within a known organizational hierarchy.

8. The method of claim 1, where the one or more priority parameters include social relationships between each of the plurality of human participants and a human presenter in the ongoing video call.

9. The method of claim 1, where the one or more priority parameters include a history of prior meeting participation for each of the plurality of human participants.

10. The method of claim 1, where all of the plurality of human participants are ranked based on their cumulative participant priorities, and the virtual conference view displays all of the plurality human participants at virtual positions within the virtual conference view corresponding to their cumulative participant priorities.

11. The method of claim 1, further comprising arranging the plurality of segmented participant video streams into a plurality of separate groups within the virtual conference view, where each separate group has a different apparent distance away from a virtual camera position, such that segmented participant video streams in groups that are relatively closer to the virtual camera position have a larger size than segmented participant video streams in groups that are relatively farther away from the virtual camera position.

12. The method of claim 11, where the ranked two or more human participants are two or more highest-priority human participants, and are arranged in a closest group to the virtual camera position.

13. The method of claim 11, where the plurality of separate groups are horizontally-aligned rows.

14. The method of claim 1, further comprising receiving a segmented presenter video stream from a client computing device corresponding to a human presenter participating in the video call, and compositing the segmented presenter video stream with the plurality of segmented participant video streams to display the segmented presenter video stream within the virtual conference view differently from the plurality of segmented participant video streams.

15. The method of claim 1, further comprising receiving a gesture notification from a client computing device indicating that the client computing device has detected that a corresponding human participant has performed a recognized gesture, based on a machine learning analysis of a corresponding segmented participant video stream depicting the corresponding human participant, and performing a gesture response action based on the gesture notification.

16. The method of claim 15, where the gesture response action includes unmuting the corresponding human participant.

17. The method of claim 15, where the gesture response action includes displaying an animation at or near a position of the corresponding participant video stream depicting the corresponding human participant.

18. The method of claim 1, where the plurality of segmented participant video streams are composited over a virtual auditorium backdrop, such that, within the virtual conference view, each of the plurality of human participants appears to occupy a virtual position within the virtual auditorium backdrop.

19. A method for video calling, comprising:
   at a client computing device, capturing a participant video stream depicting a human participant in a video call;
   applying background segmentation to the participant video stream to remove at least a portion of a real-world background visible behind the human participant, resulting in a segmented participant video stream;
   streaming the segmented participant video stream to a server computing system;

receiving, from the server device, a virtual conference view in which the segmented participant video stream is composited with a plurality of other segmented participant video streams corresponding to other human participants in the video call, such that the human participant and each of the other human participants in the video call have different apparent virtual positions within a same virtual space relative to a virtual camera, the virtual conference view displaying two or more ranked human participants at virtual positions corresponding to a cumulative participant priority for each of the two or more ranked human participants, such that human participants having higher cumulative participant priorities are displayed at apparent virtual positions within the same virtual space that are relatively closer to the virtual camera than human participants having lower cumulative participant priorities; and displaying the virtual conference view.

20. A server computing system, comprising:

a logic machine; and a storage machine holding instructions executable by the logic machine to:

receive a plurality of segmented participant video streams from a plurality of client computing devices, each segmented participant video stream depicting a different human participant participating in a video call including a plurality of human participants;

recognize one or more priority parameters for each of the plurality of human participants;

rank two or more human participants of the plurality of human participants based on a cumulative participant priority for each of the plurality of human participants, each of the cumulative participant priorities based on the one or more priority parameters for the human participant;

composite the plurality of segmented participant video streams into a virtual conference view that displays each of the plurality of human participants at different apparent virtual positions within a same virtual space relative to a virtual camera, the ranked two or more human participants having apparent virtual positions based on their cumulative participant priority and displayed with a resolution based on their cumulative participant priority, such that human participants having higher cumulative participant priorities are displayed at apparent virtual positions within the same virtual space that are relatively closer to the virtual camera, and at higher resolutions, than human participants having lower cumulative participant priorities; and send the virtual conference view to the plurality of client computing devices.

\* \* \* \* \*